Dec. 13, 1932. G. KELLER 1,890,993
MULTIPHASE PROTECTIVE SYSTEM
Filed Nov. 5, 1928 4 Sheets-Sheet 1
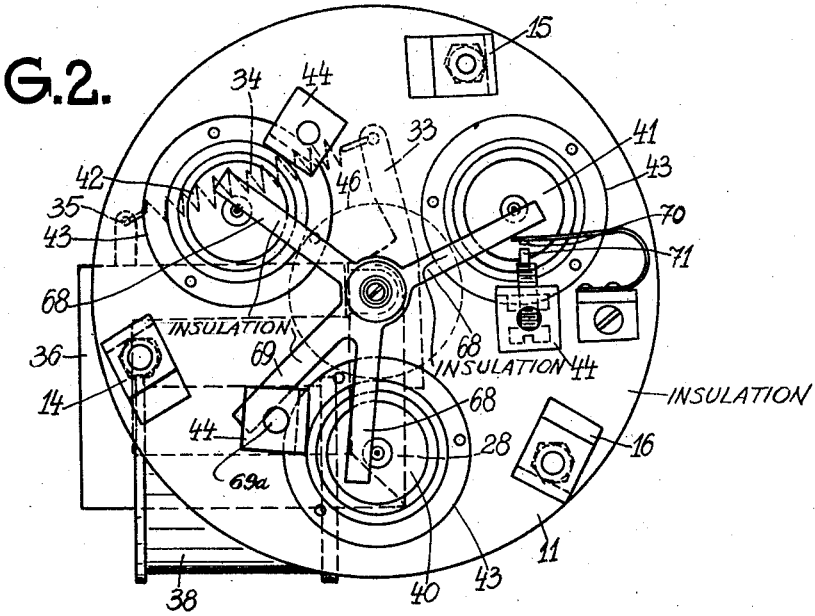
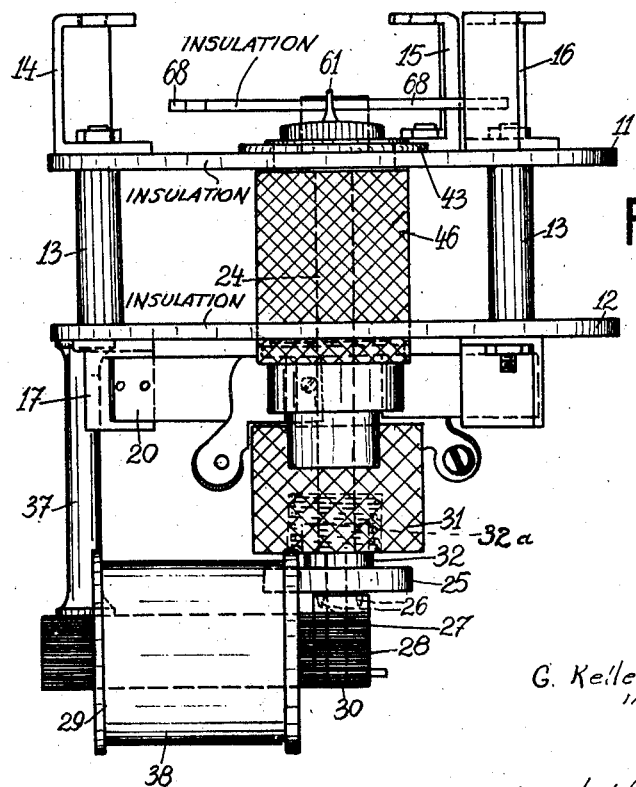
G. Keller
INVENTOR
by Marks & Clark
ATTYS.

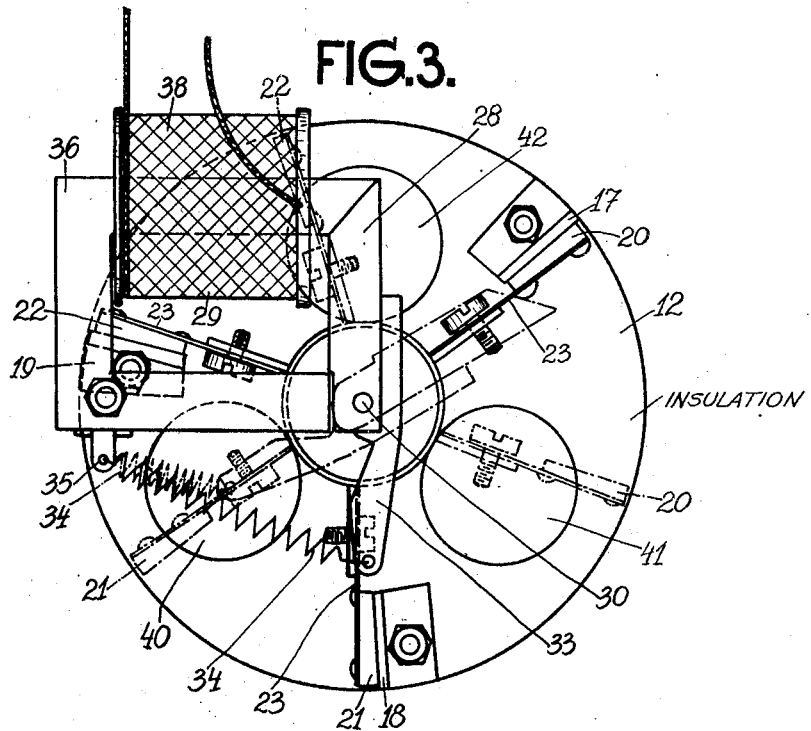

Dec. 13, 1932.  G. KELLER  1,890,993
MULTIPHASE PROTECTIVE SYSTEM
Filed Nov. 5, 1928    4 Sheets-Sheet 4
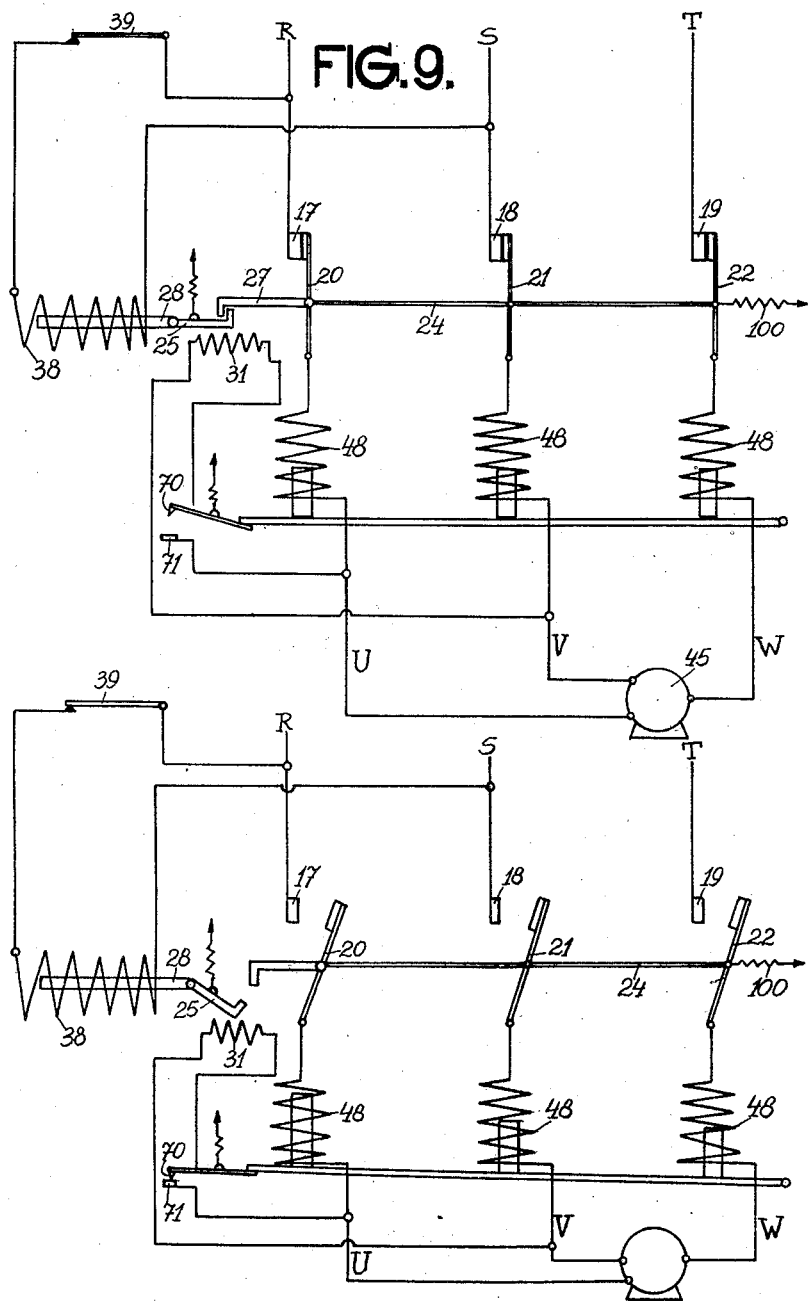

Patented Dec. 13, 1932

1,890,993

UNITED STATES PATENT OFFICE

GEORG KELLER, OF GORLITZ, GERMANY, ASSIGNOR TO THE FIRM: PAUL STROBACH, OF GORLITZ, GERMANY

MULTIPHASE PROTECTIVE SYSTEM

Application filed November 5, 1928, Serial No. 317,364, and in Germany November 8, 1927.

This invention relates to a multiphase protective system by means of which instruments, such as for instance motors or transformers may be protected against overload currents. The protection switch referring to the invention is specially adapted for multi-phase networks, but it may be used also with other species of electric current.

The new protective system is operated in such a manner that the device to be protected, in case an overload arises due either to failing of the current in one phase or to excessive normal current, is disconnected from the network without detrimental currents being permitted to pass to the device itself.

The fundamental idea of the invention is the employment of solenoids with two or several cores one core of which is permanently attracted at any amount of current and is dropped as soon as the current passing the solenoid windings is reduced to a certain amount, while the other core or cores are attracted when the current passing the windings of the solenoid exceeds a certain amount.

Another feature of the invention is that one of the overload-current cores is provided with a time lag, thus it will be attracted only if the normal current is exceeded to a small extent, but for a longer period. Such overloads may occur in multiphase networks, for instance when the current fails in one phase.

The invention relates to a suitable design of the solenoids for protective systems, that is, these solenoids are made in the form of cartridges which may be conveniently inserted into the system or into holding devices, respectively, attached to the system and may be easily removed.

The invention is illustrated by a specimen shown in the annexed drawings as follows:—

Figure 1 is a side view of the new protective system,

Figure 2 is an elevation of Figure 1,

Figure 3 is a view of the system from below according to Figure 1.

Figure 9 shows the wiring diagram of the protective system,

Figure 10 is the same wiring diagram, but here the parts are marked in the position held by them when the system has become active.

Figure 4:
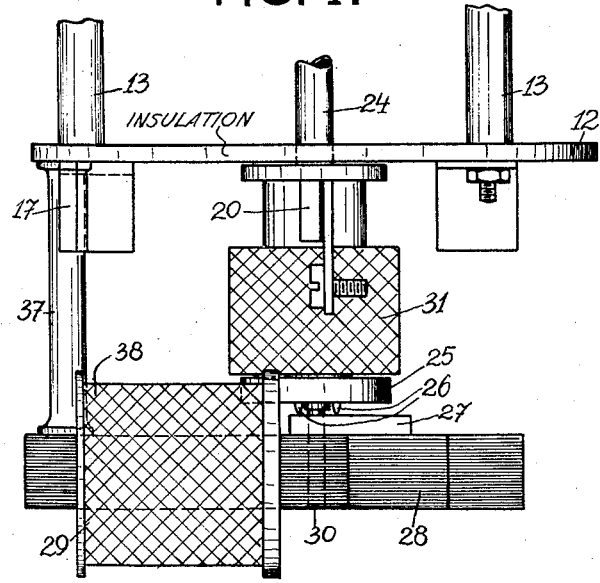
Figure 4 is a front view of the lower part of the system according to Figure 1 with the coupling disengaged.

The multiphase protective system consists of the two carrying plates 11, 12 of insulating material which are of circular shape on account of saving space. The two carrying plates 11 and 12 are tightly connected to each other by stay bolts 13. On the carrying plate 11 there are fixed the bows 14, 15, 16 which are used for connecting the three supply conductors R, S, T (Figure 9) of a three-phase circuit. The connections 14, 15, 16 are conductively connected to the metal plates 17, 18 and 19 through the stay bolts 13. These metal plates form the fixed contacts of the actual switch and are actuated together with one movable contact 20, 21, 22 each. These movable contacts are fixed at the vertical shaft 24 journaled in the frame 11, 12 and 13 by means of the springs 23. A metal disc 25 which can be shifted, but is not rotatable is carried by the shaft 24; this metal disc is furnished with several pins or clutches 26. The clutches 26 engage respective notches of a plate 27 fixed at the armature 28 of an electromagnet 29. The pivot 30 of the armature 28 coincides with the longitudinal axis of the shaft 24. On the shaft 24 there is fixed a coil 31 whose body (not illustrated) has a bore for housing and guiding the flange 32 of the disc 25. A spring 32a tends to force the disc 25 against the disc 27, i. e. to keep the coupling formed by these parts in engaged position.

At the armature 28 there is fixed an arm 33 which is engaged by a spring 34 fastened to the iron core 36 of the electromagnet 29 at 35. The electromagnet 29 is fixed to the bottom of the plate 12 by means of the column 37.

The coil 38 of the electromagnet 29 is connected to the phases R and S across a pushbutton switch or a similar device 39 (Figures 9 and 10).

The carrying plates 11 and 12 are provided with three notches 40, 41 and 42. Metal bushings 43 with internal thread are inserted into the notches 40, 41 and 42 of the plate 11. A bow 44 is fixed to each metal bushing. Each of the bows 44 is connected to one of the lines U, V, W (Figures 9 and 10) leading to the device to be protected, for instance to the motor 45. Into each metal bushing 40 there is screwed a cartridge 46 the internal construction of which shall be described later on with reference to Figures 5 to 8. On the whole each cartridge consists of a coil actuating two cores of solenoid located in its interior. One end of each coil is connected to one of the movable contacts 20, 21 and 22, while the other end of the coil is connected to one of the terminals 44. Thus in each phase R—U or S—V or T—W respectively there is such a coil between the main switch 17, 20 or 18, 21 or 19, 22 respectively and the device to be protected.

The construction of such a cartridge is as follows: The coil 48 is wound on the outside of a body 47 consisting of insulation material. Further there are fastened outside two metal rings 49 and 50. The metal ring 49 is provided with external thread 51 which can be screwed into the thread of the bushing 43. Inside of the body 47 there is arranged a cylindrical bore 52 being longer than the coil 48. Two metal cores 53 and 54 are movably journaled in this bore 52. The metal core 54 is considerably shorter than the metal core 53. The metal core 53 has an extension 55; between the latter and the recess 55a there is inserted a spiral spring 55b or any other resilient means tending to force the core 53 out of the bore 52, so that it assumes the position shown in Figure 5. This outer movement of the core 53 is limited by the cap 56 to be unscrewed. The core 53 is bored through longitudinally and in this bore there is inserted a pin 57 which is longer than the core 53, so that its lower part 58 projects into the space 59 between the core 54 and the core 53. The pin 57 has at its top an extension 60 joined by a conical point 61 projecting beyond the cartridge. In the cartridge there are provided bores 62 and 63 the purpose of which shall be described later on. The outside of coil 48 is furnished with a metal cover 63a. One end 64 of the coil is led outward through a bore of the insulator 47 and through a groove 65 of it. The other end 66 is conducted to the outside through a bore 67 of the insulator 47 and metal ring 49.

The projecting conical ends of the pins 57 of all cartridges act upon the arms 68 of a star of insulating material journaled on the plate 11. For each pin 57 there is provided such an arm 68. An arm 69 serves for limiting the movement of the star, there being an abutment 69a to limit the swinging of said arm in one direction. One arm 68 knocks against the plate spring 70 being conductively connected to one end of the coil 31. The plate spring forms the movable contact of a switch within the circuit of this coil 31. The fixed contact of this switch is formed by the head of a bolt 71 which is screwed into the bow 44 connected to the phase line U. The other end of the coil 31 is connected to the phase V, as shown by the wiring diagram of Figures 9 and 10.

Figure 8:
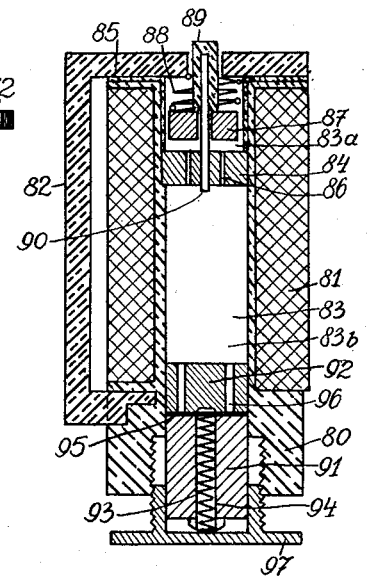
Figure 8 shows in a larger scale an axial longitudinal section across another type of such a cartridge.

One of the solenoid cartridges is provided with three cores, as shown in Figure 8. The type illustrated in Figure 8 differs slightly from the shape of cartridge according to Figures 6 and 7, but the fundamental idea of the construction is exactly the same.

The cartridge consists of a body 80 made of insulation material on the outside of which the coil 81 is wound. 82 is an iron body arranged for increasing the flux of lines of force, but it might be omitted. The cylindrical hollow space 83 of the insulator 80 is divided into the spaces 83a and 83b by an iron body 84 of magnetic material. The body 84 is forced in like a stopper and prevented from escaping upwards by inserting a bushing 85. The partition 84 is further provided with bores 86. In the space 83a there is arranged a freely movable iron core 87 actuated by a traction spring 88 tending to keep it in the shown position. Further a part 89 consisting of insulation material and projecting outward is fixed to the body 87. The body 87 shows also a pin-shaped shoulder 90 extending to the inside of space 83b.

In the space 83b there are situated two cores 91, 92. These cores are connected with each other by a spring 93 arranged in the axial longitudinal bore 94 of the lower core, so that both cores can touch each other. A leather washer 95 is preferably arranged between both cores. The core 92 is furnished with longitudinal bores 96.

A cap 97 is screwed into the bottom of the coil body 80. By screwing the cap 97 more deeply into the coil body 80 the cores 91 and 92 can be brought near the partition 84, thus even a small attractive power is sufficient to move the cores upwards.

Figure 6:
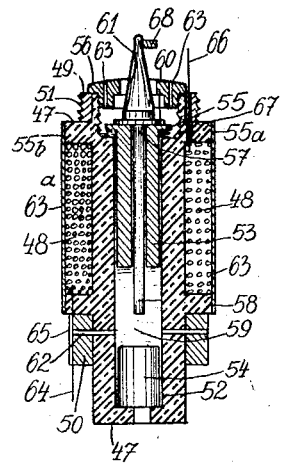
Figures 5, 6 and 7 are axial longitudinal sections across the cartridges inserted into the system at three different positions of the cores.
Figure 7:
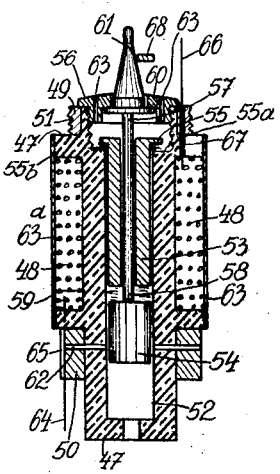

The cartridges illustrated in Figures 6 to 8 are installed in upright position, thus the cores are operated by gravity. The hollow spaces 59 and 83a and 83b respectively are filled with oil; for this purpose one uses the oil covering the whole switch in the customary manner. When the core 54 or the core 92 respectively move upward, the oil acts like a brake. In the case of the cartridge according to Figures 5 to 7 the core 54 will force the oil out of the bores 62 or 63 respectively. Since these bores are proportionately small, a certain delay in the movement of the core 54 will arise.

In the case of the Figure 8 the oil will, by the movement of the cores 91, 92, be forced through the bores 86 out of the space 83b into the space 83a where it can get out from beside the pin 89. When only the core 92 moves, the oil passes through its bores 96 partly to its back, viz. into the space between the cores 91 and 92. Thus a lead of the core 92 will be obtained over the core 91, when the movement of both cores is checked simultaneously.

The operation of the device shall be now described with special reference to the wiring diagrams of Figures 9 and 10.

As soon as the main switch 39 is thrown in, the coil 38 is supplied with current, thus attracting its armature 28. The armature 28 is connected to the shaft 24 by the coupling 25, 26, 27. In the wiring diagrams of Figures 9 and 10 these parts are outlined, moreover the shaft 24 is simply represented as a bar moving the movable contacts 20, 21 and 22 simultaneously. The rotation of the armature 28 around its axis results in the fact that the movable contacts 20, 21 and 22 are moved towards the respective fixed contacts 17, 18, 19. Consequently the coils 48 are supplied with current. Arrangements have been made that at the normal current the cores 53 and 87 only will be attracted, while the cores 54 and 91, 92 respectively remain unmoved, as the attractive power exerted on these cores by the coil at normal current is not sufficient to move same. The cores 53 and 87 respectively are thus drawn towards the interior, so that the projecting parts 61 and 89 respectively are drawn back by a certain amount. Hereby the arms 68 are released and the spring 70 slackens.

Figure 5:
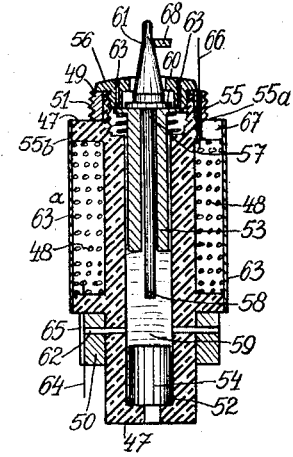

Now if the current fails or decreases below a certain minimum amount, the attractive power of the coil 48 being in this phase slackens, thus the spring 56 or 88 respectively can now move the core 53 from the position shown in Figure 6 into the position shown in Figure 5. The same conditions prevail for the cartridge according to Figure 8. Here the core 87 is attracted by the spring 88. In either case the part 61 or 89 respectively get out further, pushing the cooperating arm 68 aside, thus a rotation of the star with several arms takes place. Thus, as all the arms 68 are rigidly connected to each other, the spring 70 is swung and forced against the fixed contact 71 (Figure 10). Hereby the coil 31 is supplied with current and attracts its disk 25. The clutches 26 get out of the part of coupling 27, i. e. the coupling is disengaged. At this moment the shaft 24 is turned back under the action of a (not shown) spring, thus the contacts 20, 21 and 22 are lifted from the fixed contacts 17, 18, 19. In Figure 10 the spring is schematically marked by the traction spring 100. Due to the interruption of the phase contacts none of the coils 48 carry current.

Thus the cores 53 act at zero current. After opening the main switch 39 and removing the trouble, the original state will be restored by throwing in again the main switch 39.

In the case of short circuit or when an excessive current arises amounting to say the fourfold nominal amperage, the attractive power is so large that even the cores 54 are attracted. The cores 54 knock, at the termination of their movement, against the pin 57, and move it outward (Fig. 7). The effect is the same as mentioned above. The cores 54 act therefore as so-called short-circuit cores.

Frequently, for instance when the current fails in one phase, there arise moderate excessive currents which, however, last for a longer period and act detrimentally. Therefore means have to be provided—at least in one phase—which cut off the part to be protected only in case the current exceeds a certain amount for a certain period. Such a provision is made for instance by the above-mentioned core 91 shown in Figure 8 which core shall be called in following the core of nominal current. In the case of moderate, but lasting excessive currents both armatures 91 and 92 are simultaneously moved by the coil 81. This movement, however, is very slow, as in the space 83b there is oil or any other liquid which has to be forced out through the proportionately narrow bores 86, as mentioned above. Instead of the oil brake another time lag might be arranged. As mentioned above, it is not necessary to provide all the cartridges with a core of nominal current, but it is sufficient to furnish one of them with such a core. The core 92 is arranged in such a manner that it may move even independently of the core 91. It acts as short-circuit core, i. e. it will be attracted at suddenly arising excessive currents before the core 91 starts at all. For this purpose there are arranged in the core 92 large bores 96 through which the oil or any other liquid may pass without causing a considerable delay in the movement of the core. The intensity of current at which the core of the nominal current 91 is attracted will be adjusted by screwing in the cap 97 more or less deeply. A similar arrangement could be also made in the case of the cartridges according to Figures 5 to 7.

I claim:

1. A multiphase protective system comprising in combination with the device to be protected, in each supply conductor a first switch, a solenoid arranged in each said conductor between said switch and said device, the movable contacts of each of said switches being arranged upon a rotatable axle, a first means for rotating said axle so as to close the said switches upon the main current circuit being completed, a coupling between the said first means and the said axle, each of said solenoids being provided with a low-current core adapted to be held constantly attracted during the flow of current of any strength through said solenoid, each of said solenoids having an overload-core adapted to be attracted upon a predetermined current strength being exceeded, a second means for disengaging the said coupling, each of said cores being adapted to act upon said second means, and third means for rotating the axle so as to open the said switches.

2. In an electric relay comprising in combination with a cylindrical body of insulating material with a cylindrical boring, a coil wound upon the outside of said body, the boring being longer than said coil, a first iron core movably arranged in said boring and being shorter than said boring, a second iron core movably arranged in the room between the bottom of said first core and the bottom of the boring of said body, a pin movably arranged in a longitudinal boring of said first core, the said pin projecting on both sides out of said boring in the first core, the said first core adapted to be held attracted into the cylindrical boring of the said body during flow of current of any strength through said coil, an elastic means adapted to move the said first core out of said boring upon failure of current, the said second core adapted to be attracted by said coil upon a predetermined current strength being exceeded and to push said pin out of the said first core, the said pin adapted to follow the movements of the said first core.

3. In an electric relay according to claim 2 a third iron core adapted to be moved by said second iron core and also adapted to be attracted independent from the said second core upon a sudden and high exceeding of the predetermined strength of current.

4. In an electric relay according to claim 2 the room between said first core and said second core filled with a fluid, the second core fitting tight into the boring like a piston, holes in the said second core for the passage of the fluid during the movement of the core.

5. In an electric relay according to claim 2 means for regulating the distance between the said second core and the said coil.

6. In an electric relay according to claim 2 a third iron core adapted to be moved by said second iron core and also adapted to be attracted independent of the said second core upon a sudden and high current arising exceeding the predetermined strength of current, a longitudinal boring in said second core, a coil spring arranged in said boring and attached to said second core and said first core.

7. An electric relay for electric protective systems comprising in combination a coil, a low-current core adapted to be held attracted during flow of current of any strength through said coil and an overload core adapted to be attracted upon a predetermined current strength of current being exceeded, a cylindrical body including all said parts and adapted to be screwed into the said protective system.

8. A system of the class described, in combination with a device to be protected, a movable axle, a switch in each conductor, a solenoid in each conductor between the respective switches and the device to be protected, the movable contacts of the switch being carried by the axle and movable therewith, means operable upon completing the circuit to rotate the axle and close the switches, said solenoids being provided with low current cores held constantly attracted during the flow of current of any strength therethrough, each solenoid having overload cores adapted to be attracted when a predetermined current strength is exceeded, an electromagnet, a coupling device between the armature of the magnet and axle, and means upon the shaft for causing engagement or disengagement of the coupling, and means for rotating the axle to open the switches.

In testimony whereof I affix my signature.

GEORG KELLER.